(12) United States Patent
Swidersky et al.

(10) Patent No.: US 10,859,382 B1
(45) Date of Patent: Dec. 8, 2020

(54) SYSTEMS AND METHODS FOR INDOOR MAPPING

(71) Applicant: MappedIn Inc., Kitchener (CA)

(72) Inventors: James Nathan Swidersky, Kitchener (CA); Patrick Paskaris, Kitchener (CA); Zachary Cregan, Kitchener (CA); Erkang Wei, Waterloo (CA)

(73) Assignee: MappedIn Inc., Waterloo (CA)

( * ) Notice: Subject to any disclaimer, the term of this patent is extended or adjusted under 35 U.S.C. 154(b) by 177 days.

(21) Appl. No.: 15/915,677

(22) Filed: Mar. 8, 2018

Related U.S. Application Data (60) Provisional application No. 62/469,147, filed on Mar. 9, 2017.

(51) Int. Cl.
| | | |
|---|---|---|
| *G01C 21/00* | (2006.01) | |
| *G06T 5/00* | (2006.01) | |
| *H04W 4/00* | (2018.01) | |
| *G01C 21/20* | (2006.01) | |

(52) U.S. Cl.
CPC .................. *G01C 21/206* (2013.01)

(58) Field of Classification Search
None
See application file for complete search history.

(56) References Cited

U.S. PATENT DOCUMENTS

| | | | |
|---|---|---|---|
| 2002/0123841 A1* | 9/2002 | Satoh ................. | G01C 21/3638 701/532 |
| 2007/0050131 A1* | 3/2007 | Masuda ................. | G01C 21/20 701/533 |
| 2008/0062167 A1* | 3/2008 | Boggs ..................... | G06F 30/13 345/419 |
| 2008/0183378 A1* | 7/2008 | Weidner ................. | G01C 21/20 701/533 |
| 2017/0115121 A1* | 4/2017 | MacWilliams ...... | G01C 21/206 |

* cited by examiner

*Primary Examiner* — Adam D Tissot
(74) *Attorney, Agent, or Firm* — Own Innovation; James W. Hinton (57) ABSTRACT

A computer-readable storage medium encoded with a data structure for describing a map of a facility having venue elements is provided. Each venue element has at least one map, structural metadata and a plurality of walkable areas. A method of providing navigation instructions is also provided. The method includes providing a facility map, determining a destination on the facility map, selecting a path type, determining a target route between a current location and the destination, the target route being associated with the path type, and determining a navigation instruction along the target route.

19 Claims, 6 Drawing Sheets

SYSTEMS AND METHODS FOR INDOOR MAPPING

TECHNICAL FIELD

The embodiments disclosed herein relates to indoor maps, and, in particular to systems and methods for facility wayfinding.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

SUMMARY

According to some embodiments, there is provided a computer-readable storage medium encoded with a data structure for describing a map of a facility, comprising: venue elements, each venue element having at least one map, structural metadata and a plurality of walkable areas.

In at least one embodiment, the walkable areas are represented by at least a node graph.

In at least one embodiment, the structural metadata is represented by a polygon.

In at least one embodiment, the computer-readable storage medium as described above further comprises a vortex representing a connection between two or more nodes.

In at least one embodiment, the vortex describes how to move from one map to another.

In at least one embodiment, the computer-readable storage medium as described above further comprises a location, wherein the location stores tenant metadata.

In at least one embodiment, the computer-readable storage medium as described above further comprises entrances defining a connection between a walk-able area and a polygon.

According to some embodiments, there is provided a system including: a mobile device including a processor and operable to perform operations comprising: providing an indoor facility map associated with an application management interface on the mobile device; determining a desired destination on the facility map by receiving an input on the interface of the mobile device; selecting a path type to the desired destination on the interface of the mobile device; determining a target route between a current location of a user using the mobile device and the desired destination, the target route being associated with the selected path type; and providing a navigation instruction on the mobile device along the target route.

In at least one embodiment, the operations further includes: determining opacity of a structure along the target route; identifying a landmark and/or an object behind the structure when the structure is transparent; and providing the navigation instruction to the user by indicating which way to go in reference to the identified landmark and/or an object.

In at least one embodiment, the structure includes a wall.

In at least one embodiment, the path type comprises one of: athletic path type, exploration path type, landmarks path type, no-traffic path type, and shortest path type.

In at least one embodiment, the act of selecting the path type comprises selecting an athletic path type; and when the athletic path type is selected, the system determines the target route that directs the user through stairs instead of elevators inside an indoor facility.

In at least one embodiment, the act of selecting the path type comprises selecting an no-traffic path type; and when the no-traffic path type is selected, the system determines the target route that avoids areas with high traffic to and congestion inside an indoor facility.

In at least one embodiment, the act of selecting the path type comprises selecting an exploration path type; and when the exploration path type is selected, the system determines the target route that guides the user in front or near a new store or space inside an indoor facility.

In at least one embodiment, the act of selecting a path type comprises selecting a shortest-route path type; and when the shortest-route path type is selected, the system determines the target route that guides the user to the shortest path from the current location to the desired destination inside an indoor facility.

In at least one embodiment, the map and navigation instruction are provided on a display screen of the device.

In at least one embodiment, the facility map is a two-dimensional map.

In at least one embodiment, the facility map is a three-dimensional map.

According to some embodiments, there is provided a system including: a processor; and a user interface for providing interaction with a user, the user interface comprising a menu portion for: providing an indoor facility map to a user; determining a desired destination on the facility map by receiving an input; selecting a path type to the desired destination; determining a target route between a current location of the user and the desired destination, the target route being associated with the selected path type; and providing a navigation instruction route to the desired destination.

In at least one embodiment, the user interface further includes a menu portion for: identifying a landmark and/or an object behind a structure along the target route when the structure is transparent; and providing the navigation instruction to the user by indicating which way to go in reference to the identified landmark and/or an object.

In at least one embodiment, the path type comprises one of: athletic path type, exploration path type, landmarks path type, no-traffic path type, and shortest path type.

In at least one embodiment, the act of selecting the path type includes selecting an athletic path type; and when the athletic path type is selected, the menu portion displays the target route that directs the user through stairs instead of elevators inside an indoor facility.

In at least one embodiment, the act of selecting the path type includes selecting an no-traffic path type; and when the no-traffic path type is selected, the menu portion displays the target route that avoids areas with high traffic to and congestion inside an indoor facility.

In at least one embodiment, the act of selecting the path type includes selecting an exploration path type; and when the exploration path type is selected, the menu portion displays a target route that guides the user in front or near a new store or space inside an indoor facility.

In at least one embodiment, the act of selecting the path type includes selecting a shortest-route path type; and when the shortest-route path type is selected, the menu portion displays a target route that guides the user to the shortest path from the current location to the desired destination inside an indoor facility.

According to some embodiments, there is provided a method of providing instructions on a device to navigate an indoor facility, the method including: providing an indoor facility map on an interface of the device; inputting a desired destination on an interface of the device; selecting a path type to the desired destination on an interface of the device; determining a target route between a current location of a user of the device and the desired destination, the target route being associated with the selected path type; and providing a navigation instruction to the desired destination on the device.

In at least one embodiment, the method further includes: determining opacity of a structure along the target route; identifying a landmark and/or an object behind the structure when the structure is transparent; and providing the navigation instruction to the user by indicating which way to go in reference to the identified landmark and/or an object.

In at least one embodiment, the path type includes one of: athletic path type, exploration path type, landmarks path type, no-traffic path type, and shortest path type.

In at least one embodiment, the act of selecting the path type includes selecting an athletic path type; and when the athletic path type is selected, the method further comprises determining the target route that directs the user through stairs instead of elevators inside an indoor facility.

In at least one embodiment, the act of selecting the path type includes selecting an no-traffic path type; and when the no-traffic path type is selected, the method further comprises determining the target route that avoids areas with high traffic to and congestion inside an indoor facility.

In at least one embodiment, the act of selecting the path type includes selecting an exploration path type; and when the exploration path type is selected, the method further comprises determining the target route that guides the user in front or near a new store or space inside an indoor facility.

In at least one embodiment, the act of selecting the path type comprises selecting a shortest-route path type; and when the shortest-route path type is selected, the method further comprises determining the target route that guides the user to the shortest path from the current location to the desired destination inside an indoor facility.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
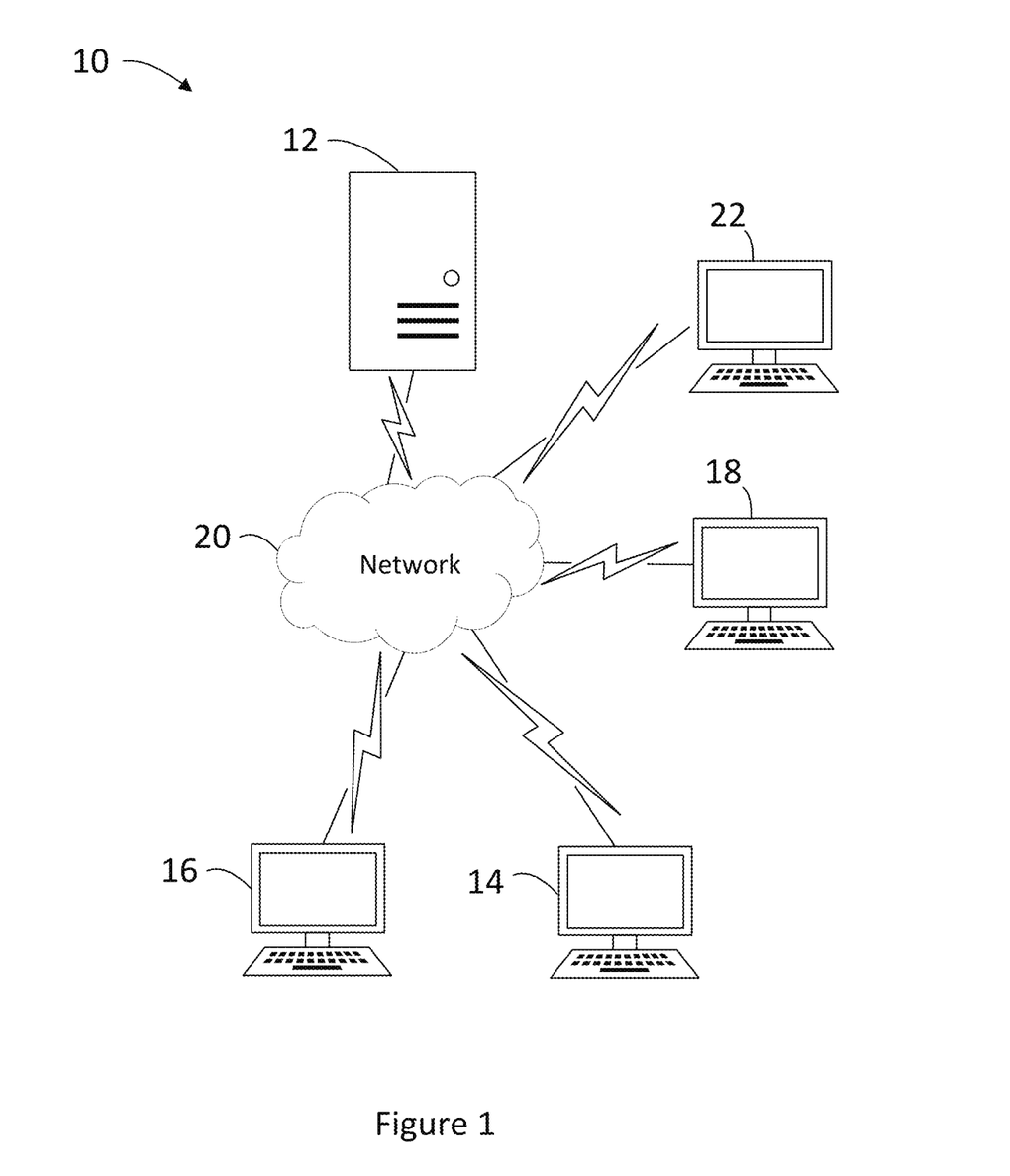
FIG. 1 is a diagram of a wayfinding system, in accordance with an embodiment.

FIG. 1 shows a block diagram illustrating a wayfinding system 10 for creating maps of a facility, in accordance with an embodiment. The wayfinding system 10 is for a facility including multiple facility units, i.e., a facility wayfinding system. The wayfinding system 10 is not restricted to a single facility, but may be extended to multiple facilities of the same type and/or different types, each including multiple facility units.

The wayfinding system 10 allows users, e.g., visitors to the facility, to orient themselves and to navigate from place to place within the facility, enabling them to find what they are looking for and to discover things around them. For example, a shopper at a mall can use the wayfinding system to search for a particular store or a particular item or class of items (e.g., shoes), navigate to the relevant location, and/or look at the current promotions.

The facility may be any type of facility. Typically, the facility is a commercial facility or an institutional facility. For example, the facility may be a retail facility, e.g., a mall or a shopping center, an office facility, e.g., an office building, an event facility, e.g., a conference center or a theme park, a transportation facility, e.g., an airport, an educational facility, e.g., a school or a university campus, or a medical facility, e.g., a hospital. The facility may be an indoor or an outdoor facility. However, the wayfinding system is particularly useful for indoor facilities.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

The wayfinding system 10 may include a facility wayfinding system, such as those described in United States Patent Application Publication Number 2014/0156186, application Ser. No. 13/852,304, which is hereby incorporated by reference in its entirety.

The wayfinding system 10 includes a server platform 12 which communicates with a plurality of store devices 14, a plurality of facility devices 16, and a plurality of administrator devices 18 via a network 20. The server platform 12 also communicates with a plurality of visitor devices 22. The server platform 12 may be a purpose built machine designed specifically for implementing a system and method for creating maps of a facility.

The server platform 12, store devices 14, facility devices 16, administrator devices 18 and user devices 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20. Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

In the description that follows, devices such as server platform 12, store devices 14, facility devices 16, administrator devices 18, and visitor devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platform 12. For example, a store user using the store device 14 may manipulate one or more input devices (e.g. a mouse and a keyboard) to interact with a user interface displayed on a display of the store device 14 to respond to questions. Generally, the device may receive a user interface from the network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of store devices 14, facility devices 16, administrator devices 18, and visitor devices 22. Generally, the information may comprise at least an identifier identifying the store, facility, administrator, or visitor. For example, the information may comprise one or more of a username, e-mail address, password, or social media handle.

In response to receiving information, the server platform 12 may store the information in storage database. The storage may correspond with secondary storage of the device 12, 14, 16, 18, 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The store device 14 may be associated with a store account. Similarly, the facility device 16 may be associated with a facility account, the administrator device 18 may be associated with an administrator account, and the visitor device 22 may be associated with a visitor account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

The devices 14, 16, 18, 22 and the server platform 12 may communicate asynchronously, for example, by using an implementation of the WebSocket protocol, such as Socket.IO. Updates may be sent from the server platform 12 to each of the devices 14, 16, 18, 22 in real time as interrupts, i.e., without polling. Likewise, user interaction data may be sent from each of the devices 14, 16, 18, 22 to the server platform 12 in real time as interrupts, i.e., without polling.

Figure 2:
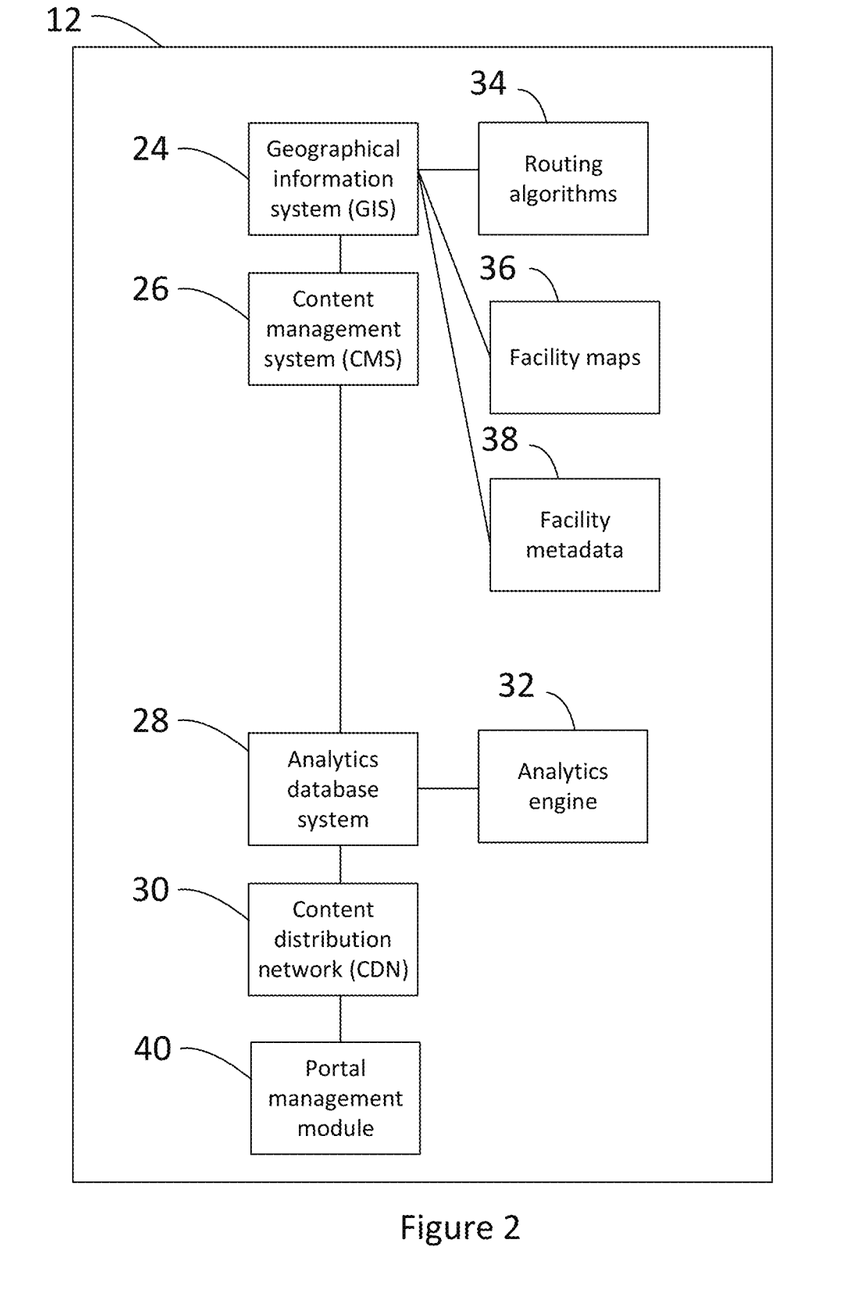
FIG. 2 is block diagram of a server platform of the wayfinding system of FIG. 1.

Turning now to FIG. 2, illustrated therein is the server platform 12, in accordance with an embodiment. The server platform 12 includes a content management system (CMS) 24, an analytics database system 26, and a geographical information system (GIS) 28. The server platform 12 may include multiple backend devices, e.g., servers. The server platform 12 may include at least a database server and a hosting server. In some instances, the server platform 12 also includes a content distribution network (CDN) 30. The CMS 26 and the analytics database system 30 may be hosted by the server platform 12. The GIS 24 may be hosted internally by the server platform 12 or supplied externally.

In some embodiments, the CMS 26 may be a frontend interface application, typically, implemented as a web service. CMS 26 may communicate with GIS 24, which then modifies the database. In this case, GIS 24 may be an Application Program Interface (API) which manipulates the database.

In some embodiments, CMS 26 stores content, including information relating to the facility and the facility units, handles updates to the content received from the devices 14, 16, 18, 22, and provides content to the devices 14, 16, 18, 22. For example, the CMS 26 may be a no structured query language (NoSQL) database application. The content stored in the CMS 26 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 38 stored in the GIS 24. This allows larger, less frequently accessed files to be stored in the CMS 26, rather than the GIS 24.

In some embodiments, the analytics database system 28 includes or is operatively connected to an analytics engine 32. The analytics database system 28 may be a database application, typically, implemented as a web service. The analytics database system 28 stores all user interactions, e.g., user selections or "hits", searches, dates, types of mobile device, and/or movement patterns represented as heat maps, in real time, and generates analytics relating to the user interactions. Advantageously, because user interactions are recorded for several different devices 14, 16, 18, 22, a relatively large sample size is obtained. The large sample size may allow analytics engine 32 to plot heat maps that are useful for users and to provide suggestions to improve user experience.

The GIS 24 is, typically, a representational state transfer (REST)-ful application programming interface (API). The GIS 24 includes routing algorithms 34, facility maps 36, and associated facility metadata 38. The GIS 24 may store the facility maps 36 and the facility metadata 38, handles updates to the facility maps 36 and the facility metadata 38, and provides the facility maps 36 and the facility metadata 38 to the devices 14, 16, 18, 22. Typically, the GIS 24 serves the facility maps 36, e.g., as PNG files, and the facility metadata 38, e.g., as JSON/XML files, over the web. The facility metadata 38 is customizable for the type of facility, and may include digital representations of paths, polygons encapsulating facility units, nodes corresponding to facility locations, identifiers for each facility unit, and qualitative metadata, such as the type of path, e.g., hallway or dirt trail.

The GIS 24 also uses the routing algorithms 34 to calculate routes and provides the routes to the devices 14, 16, 18, 22. Typically, the routing calculations output a JSON/XML list of node or polygon identifiers representing a complete path, which the devices 14, 16, 18, 22 will interpret and display. The output may also include points of interest and other metadata 38, such as total estimated travel time based on type of path and real-time traffic, as described herein.

The visitor devices 22 may be efficiently managed and run both online and offline. The visitor devices 22 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 22 may be configured to provide a smooth, intelligent personal indoor mapping experience. Visitors can access directions and venue information from anywhere in the venue. Alternatively or additionally, visitors can plan routes prior to arriving and contact a location by phone or via social media directly from their personalized profile.

The server platform 12 may include a portal management module 40 for managing the system 10. The store device 14, the facility device 16, and the administrator device 18 communicate with the portal management module 40 to create and modify facility related data.

With portal management module 40, all building data may be generated or modified using one tool via a web browser. The portal management module 40 may include collaborative tools with secure user accounts and permissions. In some embodiments, each user may be assigned a role with appropriate security credentials, such as an administrator (administrator device 18), a facility manager (facility device 16), and a store manager (store device 14). The administrator device 18 may have higher security clearance in terms of accessing and updating data, and modifying settings. The facility device 16 can change venue and store description, logos and so on, but cannot alter maps. The store device 14 can modify or alter data relating to their own store. Additional rules may be enforced if desired. For example, user A may only access and/or change certain data pertaining to certain stores, and so on.

For example, a venue editor may log into portal 40, make edits to a map 36 and save the map 36 at different stages. The unfinished map 36 may be saved in draft mode, where the editor may not have permission to publish the updated map until approved by administrator or facility owner, and the system may be configured to track approvals.

For wayfinding within indoor or semi-indoor facilities and for wayfinding within a parking facility, the following description involves an electrical communication and data processing system and related method to determine a relative location of, and routing for, a mobile electronic device with respect to an origin, a destination, and one or more intermediate points therebetween, wherein the mobile electronic device conveys location and route information to a visitor on a visitor device. The system and method also facilitate actively controlled guidance of visitors from an origin to a destination and back (forward and reverse wayfinding), including off route navigation, security and traffic load routing, and emergency evacuation.

The wayfinding system and method preferably relies on a coordinate system. The coordinate system is a mathematical framework used to analytically describe geometrical objects or spaces, such as buildings. The coordinate system may be two-dimensional or three-dimensional. For example, the wayfinding system and method may rely on a two-dimensional map or a three-dimensional map. Furthermore, the coordinate system is basically a scheme for locating points or nodes in a given space and is deployed using numerical quantities, or coordinates, which are specified with respect to some frame of reference. If the coordinates of a set of points within a given space are known, then the relationships between those coordinates and the properties of the space characterized by them can be obtained by numerical calculations instead of by other descriptions.

For example, a facility (or venue) may be characterized as a two-dimensional space, wherein any given point L within the facility can be characterized by two coordinates (x, y) representative of two horizontal axes. As another example, a facility may be characterized as a three-dimensional space, wherein any given point N within the facility can be characterized by three coordinates (x, y, z) representative of two horizontal axes and one vertical axis.

Figure 3:
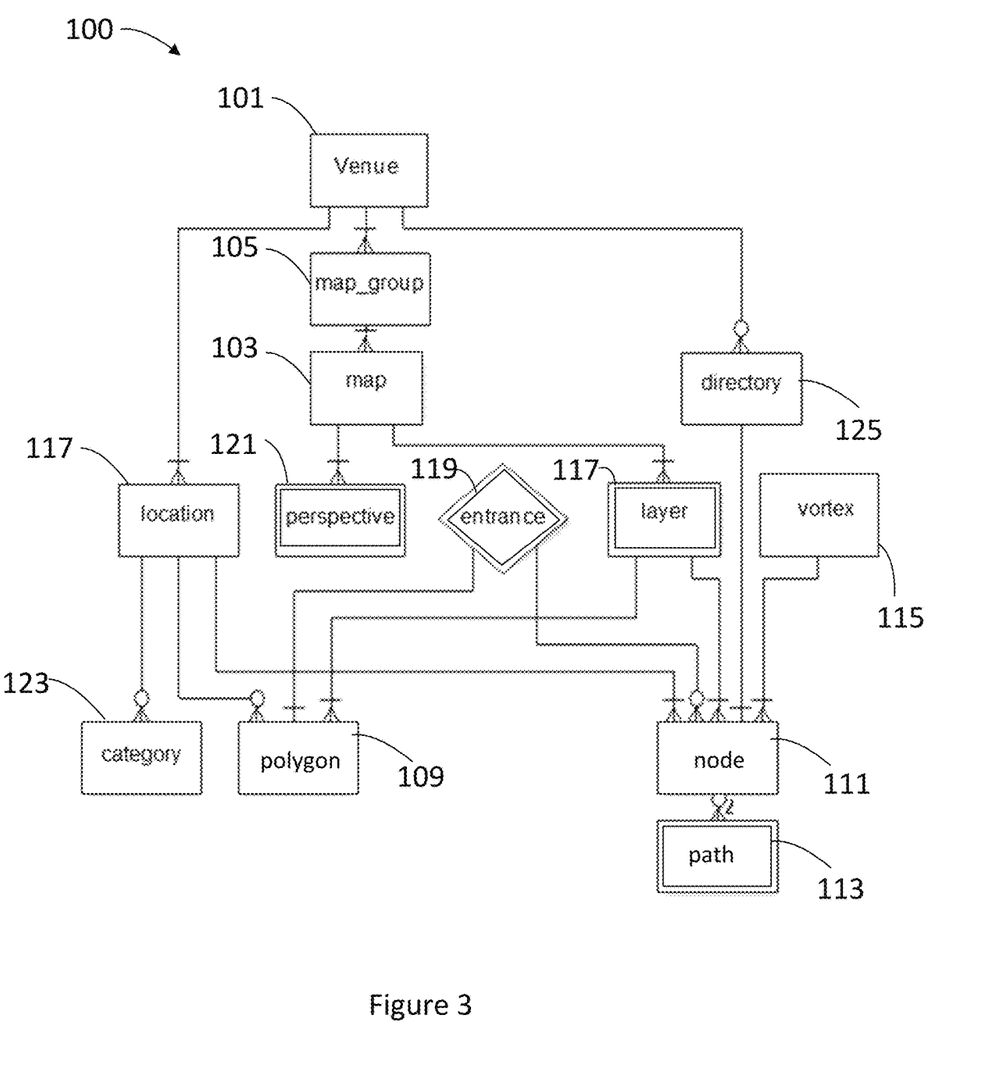
FIG. 3 is a data system for wayfinding, in accordance with an embodiment.

As shown on FIG. 3, a data system 100 is used for storing indoor spatial data and venue information. The data system 100 may be stored on a backend system such as the server platform 12 of FIG. 1. The data system 100 includes a venue 101 is made up of a series of maps 103 or map groups 105. Each map 103 contains layers 107 that group together structural information and walk-able areas.

The data system 100 includes structural information and structural metadata represented by polygons 109. The data system 100 includes walk-able areas represented by node 111 and path graph 113. The data system 100 includes vortex 115 that represents a connection between multiple nodes. The vortex 115 describes how to move from one map to another (i.e. door, stairs, elevator, escalator, etc.). The data system 100 includes a location 117 node for storing "tenant" information (stores, amenities, landmark, etc.) and is attached to nodes 111 and polygons 109. The data system 100 includes entrance nodes 119 for connecting between a walk-able point (node 111) and a structure (polygon 109). The data system 100 includes perspective nodes 121 for representing a different orientation or viewing angle of a given map 103.

Vortexes 115 may also describe moving on a single map and not just between maps. For example, if the users wants to specify a set of stairs on a map that do not travel to a different map. This is beneficial for noting parts of the path that are not accessible. An accessible flag may be added to nodes. A vortex 115 is not necessarily needed in this scenario but can still be used. It could still useful to add a vortex in this case, so stairs (or other vortex types) are easily searchable throughout a venue.

The polygon 109 may be given a number of physical attributes, such as images, color, height, inflation or deflation factors. The physical attributes for making the maps more aesthetically pleasing when rendered in two-dimensions (2D) or three-dimensions (3D).

The data system 100 includes polygon category 123 for representing different types of location. The type of location may be any of stores, cafeteria, restaurant, etc. The data system 100 includes a directory 117 for storing contact information for tenants of venue 101.

The data system 100 uses local coordinate system (e.g., instead of a GeoJSON format). The data system 100 allows the mapping of venues that do not have a static geographically location, such as cruise ships. However, the data system 100 may still be geo-referenced and placed on a world map if desired.

The data system 100 provides the infrastructure that makes it easy to create, maintain and store indoor map data. For example, using the data system 100, it is easy to model the structure of a facility (or building or venue) and attach important information. The data system 100 may store indoor spatial data and venue information of the facility. The data system 100 may be used in many interesting ways, such as for wayfinding, analytics and venue maintenance. The data system 100 may be implemented in a computer-readable storage medium encoded with a data structure.

Figure 4A:
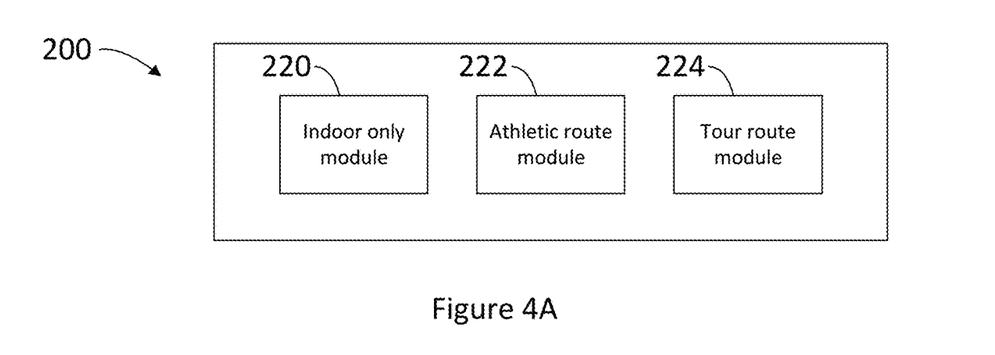
FIG. 4A is a system for wayfinding, in accordance with an embodiment.

Turning now to FIG. 4A, illustrated therein is a wayfinding system 200 and method, in accordance with an embodiment. The system 200 provides additional ways to traverse through a venue other than the shortest path. The additional ways to traverse through a venue may enhance the users' experience.

The system 200 and method of wayfinding allows user devices to ask for directions through a venue but also allows the user device to specify the type of path that the user would like to take.

The system 200 may include an indoor only route module 220. The indoor only route module determines an indoor only path. This may prevent routing outdoors to avoid undesirable weather.

The system 200 may include an athletic route module 222. The athletic route module determines an athletic path. The athletic path may avoid automated moving mechanisms such as elevators and escalators. Where the visitor user has a fitness tracker, the system 200 may automatically provide the athletic path.

The system 200 may include a tour route module 224. The tour route module determines a tour of the facility. The tour path may pass by notable landmarks.

The wayfinding system 200 and method may provide a set of directions that more accurately fits a user's personal preference, enhancing the user's travel experience. The wayfinding system 200 and method may create a better experience for the user, which may also be desirable for venue owners.

For example, where the system 200 implements the athletic route module, the system 200 may appeal to users trying to be more active and get more steps in their day. A business, such as a sporting goods store, may align its business model by encouraging a healthy and active lifestyle.

The method of providing navigation instructions may run on a visitor device (e.g., visitor device 22). On the device or mobile, the visitor has access to a map of the facility. The visitor device may store or have access to facility data such as digital maps. Such maps may be in two-dimensions or three-dimensions. The visitor device may determine a destination on the facility map. For example, a list of destinations may be provided to the visitor and the visitor select one entry from the list. The visitor device receives a path type, such as the athletic route or the indoor path. The visitor device may select an athletic route. The visitor user selects a button or touchscreen pick on the visitor device to trigger the device to map the destination points and update the display.

The device determines a target route between the current location of the visitor and a desired destination such that the target route is associated with the path type selected by the visitor. For example, if the visitor device receives an indoor path selection, the determined target route is an indoor route. The device may provide navigation instructions to the visitor along the target route. The device may also store navigation programs and routing instructions. The device is adapted to access and process map data and to calculate navigation data including routes between origins and destinations specified by a visitor.

The wayfinding system 200 and method may allow venue managers to improve the wayfinding system 200. Venue managers may provide in the facility device 18 traffic or constraint data to the wayfinding system 200. For example, the facility device may mark areas or paths on the venue maps and place constraints on these areas. The constraints may be used by the wayfinding system 200 and method to modify how a path to a destination point is calculated. The facility device determines a series of constraints to modify directions depending on a variety of factors, such as the time of day. For example, in the context of a school, the facility device may determine a series of constraints such that the wayfinding system and method directs a user through the school by avoiding main hallways for ten minutes after classes end.

In the context of a hospital, the facility device may determine a series of constraints such that the wayfinding system 200 directs a user device through the hospital by avoiding hallways with high traffic to avoid congestion, such as the emergency room. Further, in the context of a mall, the facility device may determine a series of constraints such that the wayfinding system 200 directs the user device past a new store that just opened.

Facility (or venue) managers may update the facility maps on the facility device by providing traffic or constraint data. These updates may be performed on devices similar to visitor devices. For example, using a device, a facility manager may place constraints on the map by marking areas or paths as being busy or blocked. These constraints may be entered on the map by clicking on a spot on the map or through a pickup list.

Figure 4B:
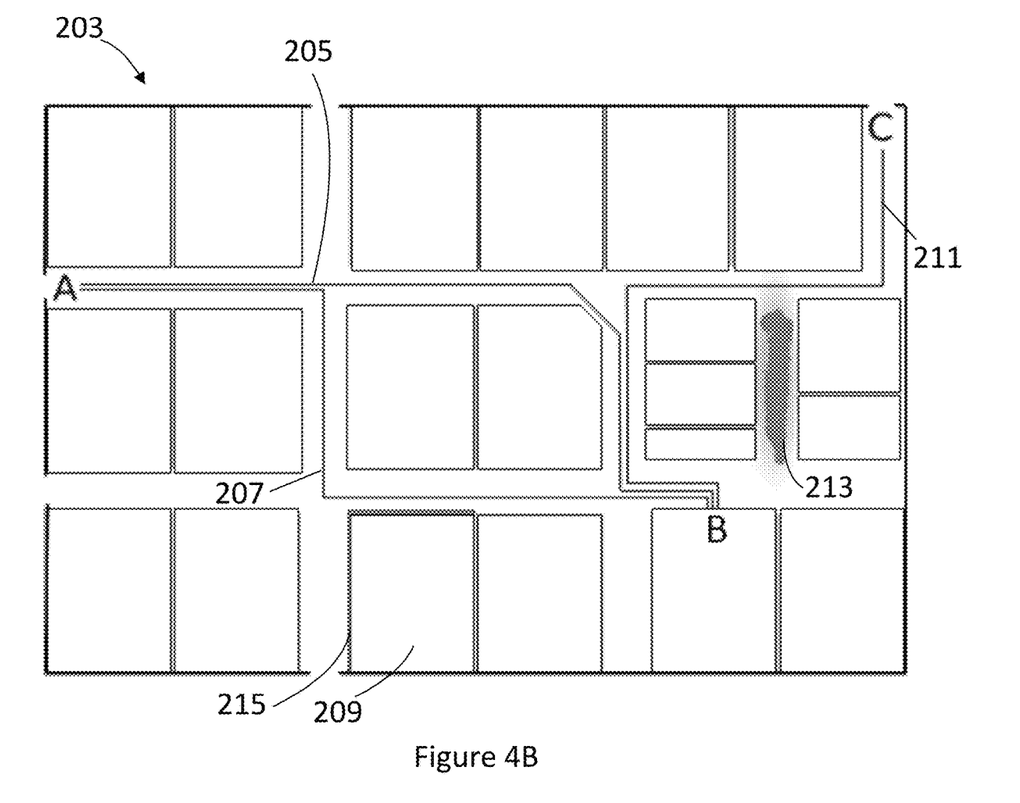
FIG. 4B is a diagram of a wayfinding route, in accordance with an embodiment.

As shown in FIG. 4B, a visitor device is travelling through a venue 203. If the visitor device is traveling from point A to point B, the red path 205 is the shortest. However, the red path 205 is not much shorter than the green path 207, and if a new store 209 just opened (blue rectangle), the visitor device is directed to take the green path 207. The new store 209 has a transparent wall 215. Where the visitor device displays the green path 207, the visitor and the mall manager could benefit from the visitor taking the green path 207 [such that the visitor can see the new store and choose to explore it to buy from that store].

As shown in FIG. 4B, the visitor device displays a blue path 211 from B to C that avoids the red area 213. The red area 213 may be congested. The system determines that avoiding the red area 213 may get the visitor to the destination (C) faster, even though the length of the path 221 is longer. The system may automatically determine the level of congestion from any one or more of time of day, iBeacons, and similar technologies.

A method of providing navigation instructions in an indoor facility includes providing an indoor facility map. The method includes determining a destination on the facility map. A user can select a destination on the facility map. The user can select a path type to the destination. For example, categories of path types can be: no traffic, athletic, exploration of new spaces, landmark exploration, shortest route, etc. The method includes determining a target route between a current location and the destination, the target route being associated with the path type. The method includes providing navigation instructions along the target route.

For example, when selecting no-traffic path type, the wayfinding system directs to the user through the indoor facility to the destination by avoiding areas with high traffic to avoid congestion. For example, using the data system for wayfinding, the wayfinding system can determine the path, walkable areas, and connections between the nodes and/or spaces of the indoor map. For example, a connection can be a mechanism that facilitates traversal between spaces. The no-traffic path type allows the user to navigate through the indoor facility by avoiding congested spaces and/or areas of high traffic.

For example, when selecting an athletic path type, the wayfinding system determines the route, which can satisfy the user's fitness needs. For example, an athletic path uses the stairs instead of the elevators when providing navigation instructions for wayfinding inside an indoor facility. For example, an athletic path can direct the user through the stairs instead of the elevators when going from the first floor to the third floor. For example, an athletic route can direct the user through a fitness space (such as a gym) with various obstacles (such as race tracks, gym equipment, etc.) inside an indoor facility.

For example, when selecting exploration-of-new-spaces path type, the wayfinding system determines a route that guides the user in front or near a space(s) inside an indoor facility. For example, the new space can be a new store, a new library, a new restaurant, a new gym, etc. For example, as shown on FIG. 4B, as there is a new store 209, the wayfinding system directs a visitor to take the green path 207 when determining how to get to from point A to point B.

For example, when selecting landmark exploration path type, the wayfinding system determines the landmarks inside the indoor facility that are between the current location of the visitor and the desired destination. For example, the wayfinding system can determine the landmarks that can potentially be on the way of the visitor when travelling from the current location to the desired destination through the indoor facility.

For example, by selecting shortest-route path type, the wayfinding system determines the shortest path from the current location to the desired destination. For example, as shown on FIG. 4B, the wayfinding system can determine the shortest path between the current location (point A) to the desired destination (point B) and directs a visitor to take the red path 205 from point A to point B.

Figure 6:
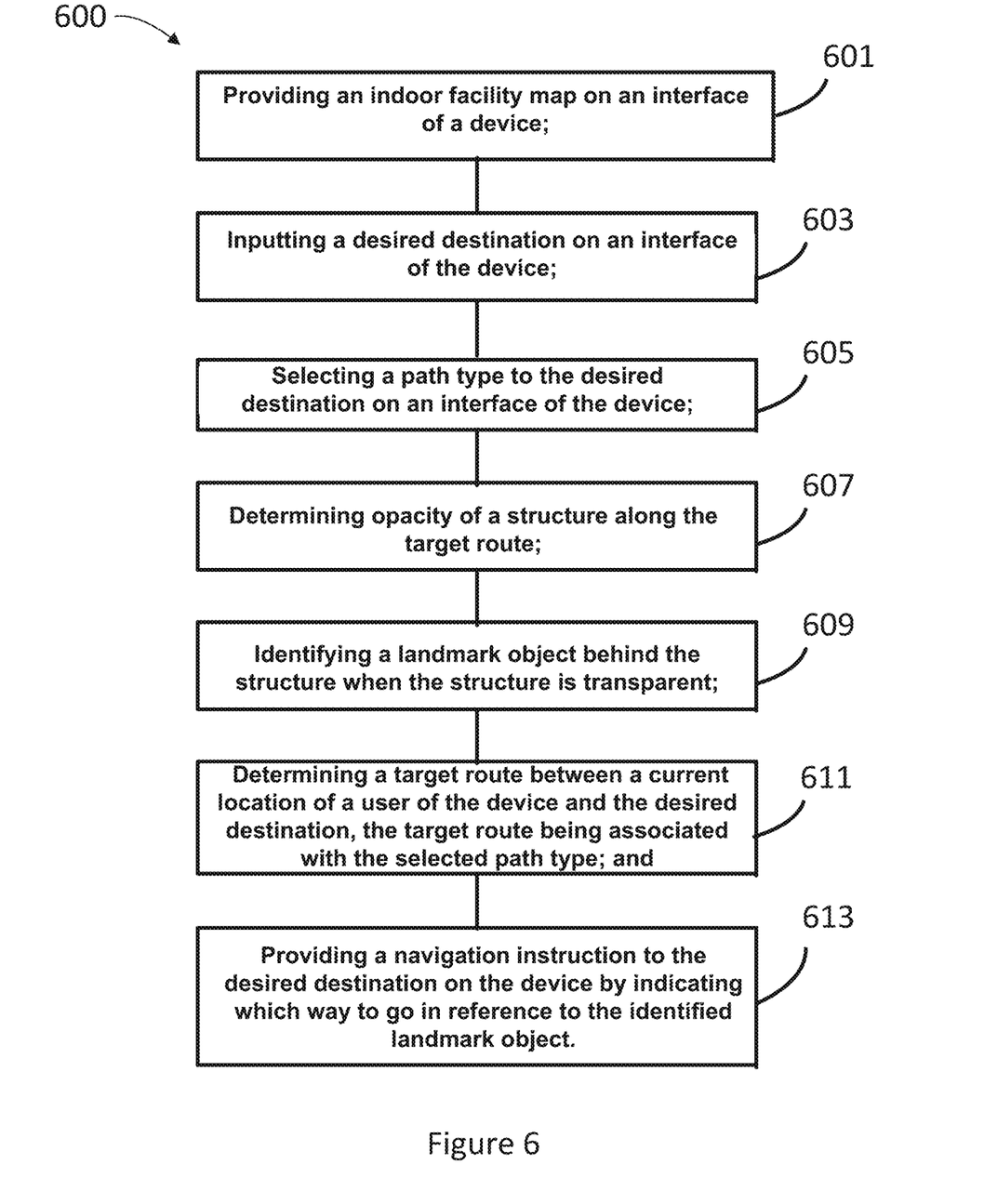
FIG. 6 is a diagram of a wayfinding method, in accordance with an embodiment.

A mobile device can perform the wayfinding method 600 referred to in FIG. 6. At 601, the method provides an indoor facility map associated with an application management interface on the mobile device. At 603, a desired destination is entered on the facility map. For example, a user can input the desired location on an interface of the device. At 605, a user can select a path type to the desired destination on the interface of the mobile device. At 607, the wayfinding method determines opacity of a structure along the target route. For example, wayfinding method can determine that the structure is a wall. For example, the wayfinding method can determine that the structure is transparent. For example, the wayfinding method can determine that the structure wall is a transparent wall, such a glass wall. At 609, the wayfinding method identifies a landmark object behind the structure when the structure is transparent. At 611, the wayfinding method determines a target route between a current location of a user and the desired destination, the target route being associated with the selected path type. At 613, the wayfinding method provides navigation instructions on the mobile device along the target route by indicating which way to go in reference to the identified landmark object. For example, the wayfinding method can instruct the user to turn left when she sees statute A behind the blue wall glass.

For example, a wayfinding system can include a user mobile device including a processor and operable to perform operations such as providing an indoor facility map associated with an application management interface on the mobile device. Then, a user can input a desired destination on a map on the mobile device. For example, the mobile device can determine a desired destination on the facility map by receiving an input on the interface of the mobile device. Then, the user can select a path type to the desired destination on the interface of the mobile device. For example, the path type can be: athletic path type, exploration path type, landmarks path type, no-traffic path type, and shortest path type. Then, the mobile device can determine a target route between a current location of the user. For example, referring to FIG. 4B, if the user is at Point A and the desired destination is point B, the mobile device can determine a route from point A to point B. For example, possible routes from point A to point B are route 205 and route 207. For example, the route can be associated with the selected path type. Then, the mobile device provides navigation instructions to the user along the target route.

For example, the wayfinding system can determine opacity of a structure along the target route. For example, the wayfinding system can identify a landmark and/or an object behind the structure when the structure is transparent and provides navigation instruction to the user by indicating which way to go in reference to the identified landmark and/or an object. For example, referring to FIG. 5, the wayfinding system is providing navigation instructions to a user along the route 305 inside an indoor facility. For example, the wayfinding system can determine that structure 307 is a transparent wall. The, the wayfinding system can identify landmark A behind transparent structure 307 and instructs the user to turn left on the intersection when landmark A is seen through the transparent structure 307.

For example, when a user selects an athletic path type, the wayfinding system determines the target route that directs the user through stairs instead of elevators inside an indoor facility. For example, when a user selects a no-traffic path type, the wayfinding system determines and directs the user through the target route that avoids areas with high traffic to and congestion inside an indoor facility.

For example, when a user selects an exploration path type, the wayfinding system determines the target route that guides the user in front or near a new store or space inside an indoor facility. For example, when a user selects a shortest-route path type, the wayfinding system determines the target route that guides the user to the shortest path from the current location to the desired destination inside an indoor facility. For example, the map and navigation instruction are provided on a display screen of the device.

Figure 5:
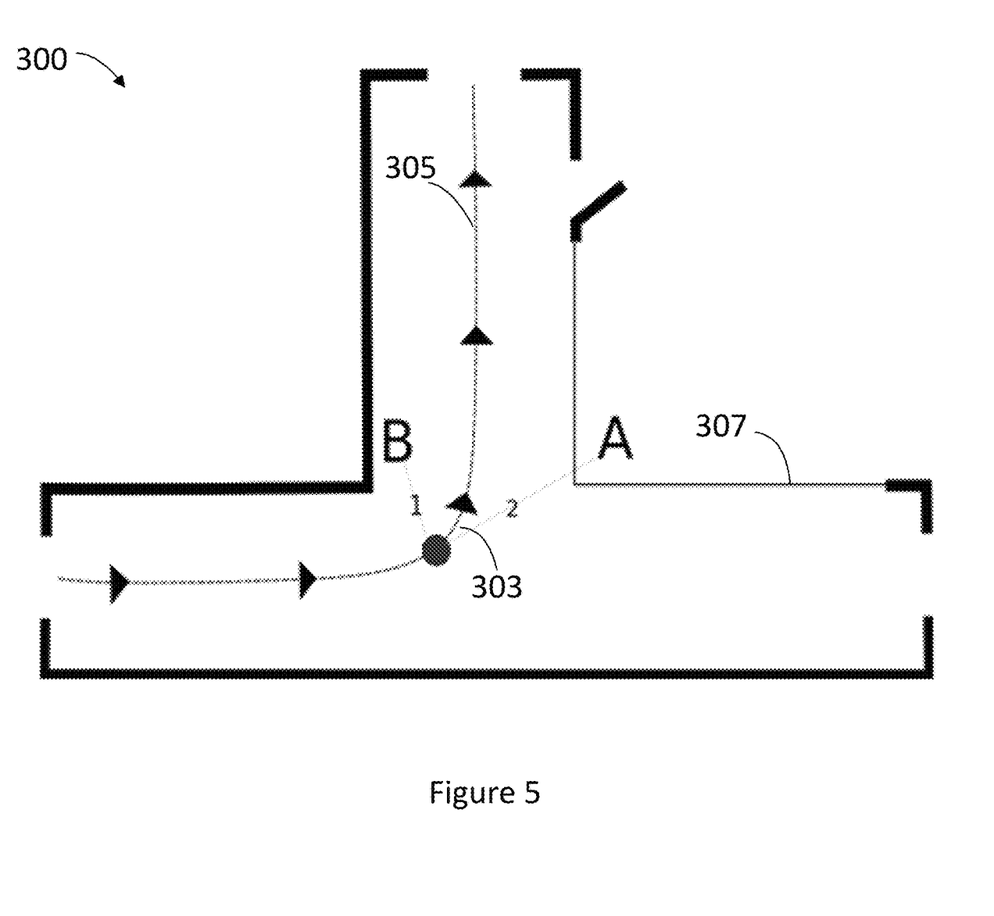
FIG. 5 is a diagram of a wayfinding route, in accordance with an embodiment.

Referring to FIG. 5, illustrated therein is a wayfinding system 300 and method for landmark recognition. The system 300 includes a visibility method to determine the best landmark to display on a user device based on any one or more of user device location and orientation, and a given a set of directions. The system 300 analyzes the surrounding area and returns landmarks in order of relevance or obviousness, taking surrounding structure's opacities and heights into account.

The system 300 includes opacity, height, and other metadata of surrounding structures to aid in the recognition process. For example, the structure may be a wall. Structure's opacities and heights may be stored as metadata of the map data model. The system 300 may analyze the surroundings of the user more thoroughly by taking into account the opacity of the structure, such as seeing through the structure if it is a transparent wall. The system may also analyze the surroundings of the user more thoroughly by taking into account the height of the structure, such as seeing over a wall. For example, such wall may be shorter than the average person's height or surrounding structures.

As shown in FIG. 5, a visitor device 303 (red circle) is traveling along the black-dashed path 305 in the direction of the arrows. The solid blue line 307 represents a transparent glass wall.

When approaching the intersection, conventional systems may recognize landmark B and may output "Turn left at 'Landmark B'". However, this could be confusing to the user for various reasons. First, landmark B is not visible until the user is past the corner. Second, by the time the user sees landmark B, the user is already facing the direction that the user is supposed to go, so telling the user to turn left at the time of sight could be inaccurate or confusing.

In contrast to conventional systems, the system 300 recognizes that the blue wall 307 is glass and looks through the wall 307 to detect landmarks behind the wall 307 that are more directly in the user's line of sight. In this case, the system 300 recognizes landmark A to be the best choice and output to the user device to "Turn left at 'Landmark A'", removing ambiguity in this situation.

The method of generating a navigation instruction to a landmark may run on a visitor device (such as visitor device 22). The device has access to a map of the facility. The program on the device automatically determines and processes one or more characteristics of the visitor such the location and orientation of the visitor within the facility by using and reading the sensors on the device.

The device may also access the visitor's preferences stored on therein, such as attraction and activity preferences. Then, the program on the device analyzes the surrounding area of the visitor to identifying one or more landmarks that might be of interest to the visitor by taking into account at least one or more features of structures of the facility.

The program on the device reads metadata of the structures to determine their opacities and heights. For example, structures of the facility may be walls located thereon. For example, such walls may be visible on the facility map. For example, the program on the device may determine that a structure is transparent glass wall, which suggest that the visitor will see anything before such glass wall. As such, if a landmark is located behind such glass wall, the method recognizes that the visitor will see such landmark through the transparent glass wall.

The program on the device may ask the visitor to select a point of interest between the identified landmarks. The visitor selects by pressing a button or touchscreen pick which would trigger the device to map the destination points and update the display on the device. Then, the program on the device determines a target route to the selected point of interest. Finally, the program on the device provides navigation instructions to the visitor along the target route to the selected point of interest. The device may also store navigation programs and routing instructions.

While the above description provides examples of one or more apparatus, methods, or systems, it will be appreciated that other apparatus, methods, or systems may be within the scope of the claims as interpreted by one of skill in the art.

The invention claimed is:

1. A mobile device including a processor and operable to perform operations comprising:
   providing an indoor facility map associated with an application management interface on the mobile device;
   determining a desired destination on the facility map by receiving an input on the interface of the mobile device;
   selecting a path type to the desired destination on the interface of the mobile device;
   determining a target route between a current location of a user using the mobile device and the desired destination, the target route being associated with the selected path type;
   identifying a transparent structure along the target route, wherein the transparent structure is identified by opacity metadata;
   identifying a landmark object behind the transparent structure, wherein the landmark object is identified by location metadata; and
   providing a navigation instruction on the mobile device along the target route by indicating which way to go in reference to the identified landmark object itself, without requiring reference to the transparent structure.

2. The system of claim 1, wherein the path type comprises one of: athletic path type, exploration path type, landmarks path type, no-traffic path type, and shortest path type.

3. The system of claim 1, wherein the act of selecting the path type comprises selecting an athletic path type; and
   wherein when the athletic path type is selected, the system determines the target route that directs the user through stairs instead of elevators inside an indoor facility.

4. The system of claim 1, wherein the act of selecting the path type comprises selecting an no-traffic path type; and
   wherein when the no-traffic path type is selected, the system determines the target route that avoids blocked or busy areas inside an indoor facility.

5. The system of claim 1, wherein the act of selecting the path type comprises selecting an exploration path type; and
   wherein when the exploration path type is selected, the system determines the target route that guides the user in front or near a store or space inside an indoor facility.

6. The system of claim 1, wherein the act of selecting a path type comprises selecting a shortest-route path type; and
   wherein when the shortest-route path type is selected, the system determines the target route that guides the user to the shortest path from the current location to the desired destination inside an indoor facility.

7. The system of claim 1, wherein the map and navigation instruction are provided on a display screen of the device.

8. The system of claim 1, wherein the facility map is any one of a two-dimensional map or a three-dimensional map.

9. A system comprising:
   a processor; and
   a user interface for providing interaction with a user, the user interface comprising a menu portion for:
      providing an indoor facility map to a user;
      determining a desired destination on the facility map by receiving an input;
      selecting a path type to the desired destination;
      determining a target route between a current location of the user and the desired destination, the target route being associated with the selected path type, wherein the path type comprises one of: athletic path type, exploration path type, landmarks path type, no-traffic path type, and shortest path type;
      identifying a landmark object behind a transparent structure along the target route, wherein the transparent structure is identified by opacity metadata and the landmark object is identified by location metadata; and
      providing a navigation instruction along the target route to the desired destination by indicating which way to go in reference to the identified landmark object itself, without requiring reference to the transparent structure.

10. The system of claim 9, wherein the act of selecting the path type comprises selecting an athletic path type; and
    wherein when the athletic path type is selected, the menu portion displays the target route that directs the user through stairs instead of elevators inside an indoor facility.

11. The system of claim 9, wherein the act of selecting the path type comprises selecting an no-traffic path type; and
    wherein when the no-traffic path type is selected, the menu portion displays the target route that avoids areas with high traffic to and congestion inside an indoor facility.

12. The system of claim 9, wherein the act of selecting the path type comprises selecting an exploration path type; and
    wherein when the exploration path type is selected, the menu portion displays a target route that guides the user in front or near a newly opened store or space inside an indoor facility.

13. The system of claim 9, wherein the act of selecting the path type comprises selecting a shortest-route path type; and
    wherein when the shortest-route path type is selected, the menu portion displays a target route that guides the user to the shortest path from the current location to the desired destination inside an indoor facility.

14. A method of providing instructions on a device to navigate an indoor facility, the method comprising:
    providing an indoor facility map on an interface of the device;
    inputting a desired destination on the interface of the device;
    selecting a path type to the desired destination on the interface of the device;
    determining a target route between a current location of a user of the device and the desired destination, the target route being associated with the selected path type;
    identifying a transparent structure along the target route, wherein the transparent structure is identified by opacity metadata;
    identifying a landmark object behind the transparent structure, wherein the landmark object is identified by location metadata; and providing a navigation instruction to the desired destination on the device by indicating which way to go in reference to the identified landmark object itself, without requiring reference to the transparent structure.

15. The method of claim 14, wherein the path type comprises one of: athletic path type, exploration path type, landmarks path type, no-traffic path type, and shortest path type.

16. The method of claim 14, wherein the act of selecting the path type comprises selecting an athletic path type; and when the athletic path type is selected, the method further comprises determining the target route that directs the user through stairs instead of elevators inside an indoor facility.

17. The system of claim 14, wherein the act of selecting the path type comprises selecting an no-traffic path type; and when the no-traffic path type is selected, the method further comprises determining the target route that avoids blocked or busy areas inside an indoor facility.

18. The system of claim 14, wherein the act of selecting the path type comprises selecting an exploration path type; and when the exploration path type is selected, the method further comprises determining the target route that guides the user in front or near a store or space inside an indoor facility.

19. The system of claim 14, wherein the act of selecting the path type comprises selecting a shortest-route path type; and when the shortest-route path type is selected, the method further comprises determining the target route that guides the user to the shortest path from the current location to the desired destination inside an indoor facility.

\* \* \* \* \*